(12) United States Patent
Buch

(10) Patent No.: US 7,080,376 B2
(45) Date of Patent: Jul. 18, 2006

(54) HIGH PERFORMANCE SYNCHRONIZATION OF ACCESSES BY THREADS TO SHARED RESOURCES

(75) Inventor: Deep K. Buch, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 645 days.

(21) Appl. No.: 09/960,545

(22) Filed: Sep. 21, 2001

(65) Prior Publication Data

US 2003/0061394 A1   Mar. 27, 2003

(51) Int. Cl.
 *G06F 9/46* (2006.01)
(52) U.S. Cl. ..................... 718/100; 718/102
(58) Field of Classification Search ............... 718/100, 718/102–104, 107, 108; 719/310, 318
 See application file for complete search history.

(56) References Cited

U.S. PATENT DOCUMENTS

| | | | | |
|---|---|---|---|---|
| 5,781,775 A * | 7/1998 | Ueno | ........................ | 718/102 |
| 5,875,337 A * | 2/1999 | Miyano | ..................... | 717/151 |
| 6,026,427 A * | 2/2000 | Nishihara et al. | ........... | 718/106 |
| 6,351,778 B1 * | 2/2002 | Orton et al. | ................. | 719/310 |
| 6,766,349 B1 * | 7/2004 | Belkin | ........................ | 718/104 |
| 6,826,761 B1 * | 11/2004 | Damon et al. | .............. | 719/328 |

OTHER PUBLICATIONS

E. Armstrong, "Hot Spot: A New Breed of Virtual Machine", Java World (Mar. 1998) http://www.javaworld.com/javaworld/jw-03-1998/jw-03-hotspot.html.

Dimpsey et al. "Java Server Performance: A case study of building efficient, scalable JVM's", IBM Systems Journal, vol. 39, No. 1, 2000. http://www.research.ibm.com/journal/sj39-1.html.

Java HotSpot whitepaper, "Performance Engine Architecture", Apr. 1999, http://java.sun.com/products/hotspot/whitepaper.html.

G.L. Peterson, "Myths About the Mutual Exclusion Problem", Information Processing Letters, vol. 12 No. 3: pp. 115-116, Jun. 13, 1981.

M. Ahamad et al. "The Power of Processor Consistency", In. Proc. $5^{th}$ Intl Symp on Parallel Algorithms and Architectures, pp. 251-260, Jun. 1993. Tech Report GIT-CC-92/34, College of Computing, Georgia Institute of Technology. http:// portal.acm.org/citation.cfm?id=165264&coll=portal &dl=ACM&CFID=1099009&CF] . . . .

L. Higham and J. Kawash, "Bounds for Mutual Exclusion with only Processor Consistency", Dept. of Computer Science, Univ. of Calgary, Canada. 14 Pages.

* cited by examiner

*Primary Examiner*—William Thomson
*Assistant Examiner*—George Opie
(74) *Attorney, Agent, or Firm*—Blakely, Sokoloff, Taylor & Zafman LLP

(57) ABSTRACT

In one aspect of the invention is a method to synchronize accesses by multiple threads to shared resources. The method entails a first thread entering a processing queue to contend for a lock on a shared resource. If a second thread exists, where the second thread is currently executing code, then the first thread may execute the critical section of code if the second thread is not currently executing the critical section; or if the second thread is currently executing the critical section of code, then the first thread may continue to contend for ownership of the shared resource until the second thread relinquishes ownership of the shared resource, or until a yield count expires.

6 Claims, 6 Drawing Sheets

```
1   void manipulate () {
2       // code
3       synchronized (syncObj) {
4           // critical section
5       }
6       // code
7   }
```

*FIG. 1*

```
1   shared objects:

2   flag[0..n-1] in {-1, .. n-2}

3   turn[0..n-2] in {0, .. n-1}

4   flag[i] <- -1

5   <entry>

6   for k=0 to n-2 do 7        flag[i] <- k 8        turn[k] <- i 9        while      (there exists j!=i, 10                   flag[j] >= k and 11                   turn[k] = i) do nothing

12

13  <critical section>

14

15  <exit>

16  flag[i] <- - -1
```

FIG. 2

| Process A | Line No. | Process B |
|---|---|---|
| <entry> | 1 | <entry> |
| for k=0 to 0 do | 2 | for k=0 to 0 do |
|     flag[0] <- 0 | 3 |     flag[1] <- 0 |
|     turn[0] <- 0 | 4 |     turn[0] <- 1 |
|     while(there exists | 5 |     while(there exists |
|     j!=0, flag[j] >= 0 | 6 |     j!=1, flag[j] >= 0 |
|     and turn[0] = 0) | 7 |     and turn[0] = 1) |
|     do nothing | 8 |     do nothing |
| <critical section> | 9 | <critical section> |
| <exit> | 10 | <exit> |
| flag[0] <- - -1 | 11 | flag[1] <- - -1 |

*FIG. 3*

```
<entry> for (int k=0; k <= (to numThreads-2); k++) { flag[tid] = k; //"tid" is "i" in Peterson's algorithm turn[k] = tid toYield = 0;

do { if (toYield++ >= YieldCount)

Thread.yield();

allflag = false;

for (int j=0; j < numThreads; j++) { if (j==tid)

continue;

allflag = allflag || (flag[j] >= k);

}

} while (allflag && turn[k]==tid);

}
//critical section

//exit flag[tid] = -1
```

FIG. 4

HIGH PERFORMANCE SYNCHRONIZATION OF ACCESSES BY THREADS TO SHARED RESOURCES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Intel Corporation, All Rights Reserved.

FIELD OF THE INVENTION

This invention relates to the field of accessing shared resources, and more specifically to an efficient method of synchronizing multiple accesses.

BACKGROUND OF THE INVENTION

The mutual exclusion problem is concerned with ensuring that two concurrently executing threads (also known as processes) of control do not both reach a critical section of code at the same time. The critical section of code is that section of code in which a shared resource is accessed. Mutual exclusion is important if a program requires exclusive control over resources in order to be sure of giving the right result. A key bottleneck that limits performance is the implementation of "locking", which is a mechanism that ensures mutual exclusion.

Typically, a hardware "lock" instruction (such as XCHNG), or variant thereof, is used to manage exclusive access. A lock instruction ensures an atomic read-modify-write transaction, thus guaranteeing that only one thread can acquire lock ownership at a time. One disadvantage of a lock instruction is that it has a performance penalty on modern high performance microprocessors.

In Java, a Java Virtual Machine (JVM) manages this by avoiding the use of a lock instruction as much as possible. A JVM is a machine in software that provides the run-time environment for Java programs, and is responsible for implementing the required locking mechanism. Depending on the implementation approach taken by the JVM, there can be a wide variation in performance on e-business (electronic business) software running on a server.

Alternatively, a Java programmer may use the "synchronized" keyword to ensure mutual exclusion. FIG. 1 shows the typical usage of this keyword in a Java program. In this example, a procedure called "manipulate" (line 1) comprises code (lines 2 and 6), and utilizes the "synchronized" keyword (line 3) to obtain a lock on the object "syncobj" prior to running a section of the code which uses the object "syncobj" (line 4). Use of this primary mechanism for ensuring mutual exclusion of a shared resource has its disadvantages. When multiple threads contend for a shared resource, the performance of a computer system can be drastically impacted.

Consequently, Java programmers may use other existing algorithms to ensure mutually exclusive access to a shared resource. One such algorithm is a classic one of G. L. Peterson, as illustrated in pseudocode in FIG. 2. Peterson's algorithm provides one way of achieving mutual exclusion for N concurrent threads. The basic premise of the Peterson algorithm is that for a given thread i, its critical section (line 13) may only be entered if one of the while-loop (lines 9–11) conditions tests false. The first condition (line 9) is false if thread i is the only thread running (j!=i, where j is a thread, other than i, currently executing); the second condition (line 10) becomes false if thread j has completed, where thread j resets the flag variable to –1 upon completion; and the last condition (line 11) becomes false if another thread enters the processing queue.

One disadvantage of the Peterson algorithm is poor performance as the number of threads increases. A thread that owns a lock can lose the CPU (central processing unit) in the normal course of operating system thread scheduling. Thereafter, every other thread in the run queue gets the CPU, spins for its quantum, and then loses the CPU to the next thread in the queue. The more threads there are, the less quantum of time a given thread has. Moreover, the variables are shared variables in memory, further causing processing delays. The more threads, the worse this problem becomes. As a result, not much useful work is accomplished.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates code for implementing locking using the "synchronized" keyword in a Java program.

FIG. 2 illustrates psuedocode for implementing locking using the classic Peterson's algorithm.

FIG. 3 illustrates Peterson's algorithm where there are two threads.

FIG. 4 illustrates the yielding algorithm in Java code for implementing locking.

DETAILED DESCRIPTION OF THE INVENTION

Figure 5:
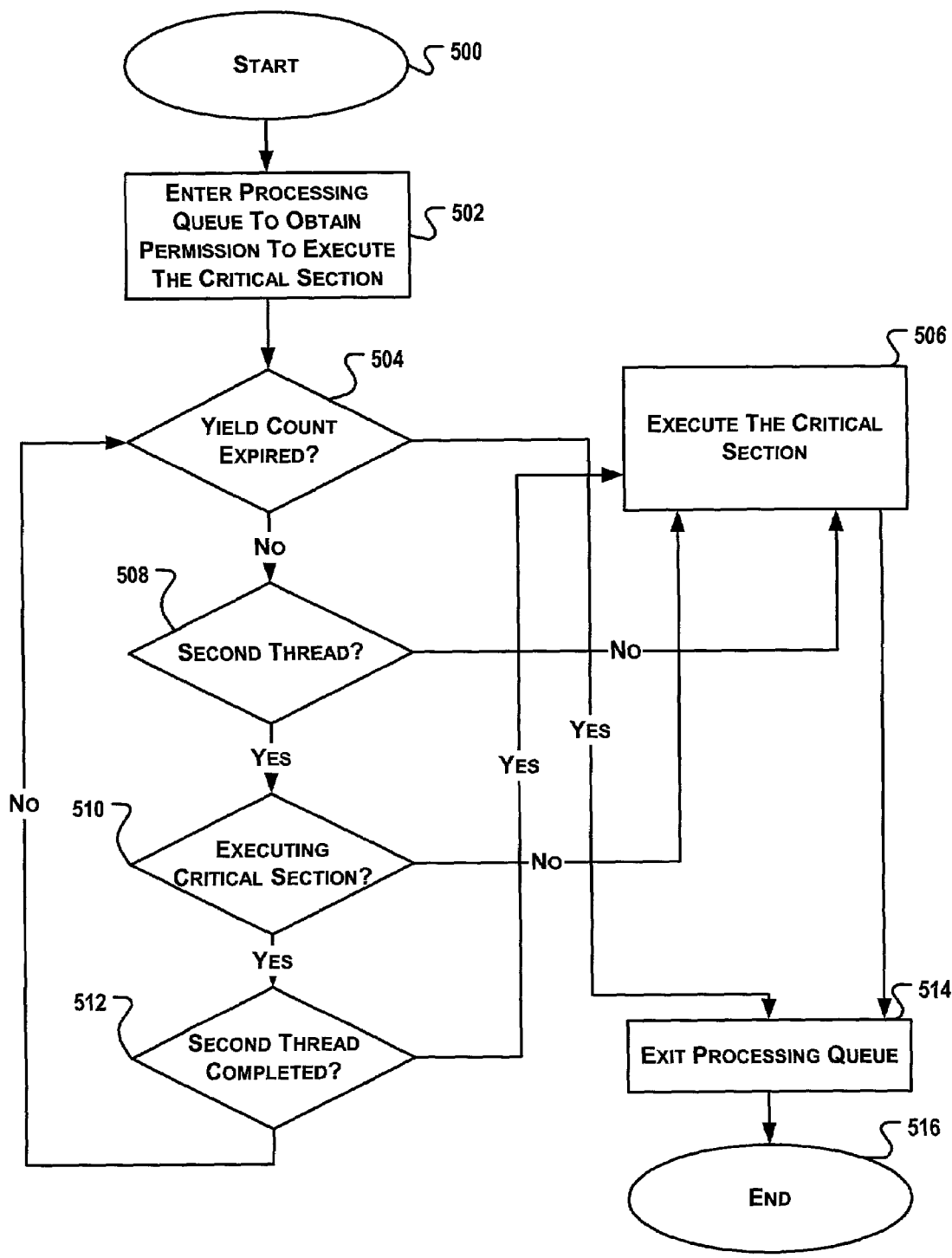
FIG. 5 illustrates a method in accordance with embodiments of the invention.

Described herein is a method for job threads to synchronize accesses to a shared resource. A contending thread enters a processing queue to compete for execution of a critical section of code. The contending thread checks for shared variables in memory to determine if a concurrent thread is currently executing the critical section of code. If a concurrent thread is currently executing the critical section of code, then the contending thread continues to contend for the critical section until the concurrent thread completes execution of the critical code or until a yielding count expires.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a thread according to the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions.

Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

In embodiments of the invention, a yielding algorithm is added to a mutual exclusion algorithm, such as Peterson's algorithm. The yielding algorithm in accordance with embodiments of the invention enables a contending thread to enter a processing queue and contend for ownership of a shared resource while alleviating poor performance associated with unlimited and uncontrolled accesses to shared variables in memory.

Terms

Shared resource: a shared resource is an object that is available to multiple threads, but which may not be concurrently accessed (i.e., accessed by more than one thread).

Critical section of code: that section of code corresponding to a given thread in which a shared resource is accessed. In some embodiments, all threads have the same corresponding critical section. For instance, in object oriented programming, such as in Java, assume a class Foo that extends Thread. In Thread, the run( ) method contains the critical section of code. Multiple instantiations of class Foo are created, and the start( ) method is called on all these objects/threads derived from class Foo. All Foo threads start executing the same code, but only one Foo thread can execute the critical section of the code at a time.

In other embodiments, one or more threads may have different critical sections of code. For instance, one thread may need the shared resource to write to so that its corresponding critical section of code implements a write to the shared resource, while another thread may need the shared resource to back it up so that its corresponding critical section of code implements a backup of the shared resource. In each case, the thread needs to obtain a lock on the shared resource prior to accessing the shared resource, i.e., prior to entering its own critical section of code. However, the critical section of code for each of the threads is different.

In both embodiments, only one thread may enter the critical section of code (whether the critical section of code is the same or different one) at a time.

Contending thread: a thread which is currently contending for a shared resource. This is illustrated as thread i in accompanying figures.

Concurrent thread: a thread that is executing code simultaneously with a contending thread. This is illustrated as thread j in accompanying figures. A concurrent thread may or may not be executing the critical section of code. If it is executing the critical section of code, then flag [j]>=k and turn [k]=i, but if it is not executing the critical section of code, then flag [j]<k and turn [k]=i, or flag [j]>=k and turn [k]<>i. There may be 0 or more concurrent threads, but only one concurrent thread may be executing the critical code.

Entering the Processing Queue

When a concurrent thread enters a processing queue, it contends for ownership, or locking, of a shared resource. Put another way, when a concurrent thread enters a processing queue, it contends for entering the critical section. In the process of contending for ownership of a shared resource, a first thread checks shared variables in memory to determine if a second thread exists. If it does, then it checks to see if it has a lock on the shared resource. If the second thread has a lock on the shared resource, then the first thread continues checking shared variables in memory until the second thread relinquishes the lock.

Peterson's Algorithm

FIG. 3 illustrates Peterson's algorithm for two threads (where n=2). This algorithm utilizes two conditions: a turn variable for ensuring that a thread i, is placed in the processing queue, and a flag variable for indicating the status of another thread j. The status flag is a single-writer, as it may be written to by a single thread only (i.e., each thread may write to its own flag), while the turn variable is a multi-writer that may be written to by all threads. Both variables can be read by all threads.

Under Peterson's algorithm, for a given thread i, variable turn ensures that thread i is put in the processing queue for usage of the shared resource, and flag [j] monitors occupancy in the critical section of code for another thread j. For purposes of illustration, thread i is a given thread competing to execute the critical section of its code, and thread j is a thread other than i if there are multiple threads executing (but if there is only one thread running, j=i). Thus, in FIG. 3, i=0 for thread A, and i=1 for thread B. For two threads as shown in FIG. 3, j=1 in thread A, and j=0 in thread B.

FIG. 3 assumes that thread A and thread B are both competing to enter the critical section of their respective codes. Assume that thread A beats thread B to this code, but that thread B executes this code immediately thereafter. Thus, thread A tests for the conditions in the while-loop first:

the first condition (line 6) tests TRUE since another thread (thread B) is executing, and that thread is not thread A.

the second condition (line 6, flag [j]>=0) tests TRUE since thread B has entered the code immediately following thread B, and has therefore set flag [j] to 0, where j=1 for thread B.

the third condition (line 7, turn [0]=0) tests FALSE now since thread B has entered the code and set turn [0] to 1.

Immediately thereafter, for thread B:

the first condition (line 6) tests TRUE since another thread (thread A) is executing, and that thread is not thread B.

the second condition (line 6, flag [j]>=0) tests TRUE since thread A is currently executing, and has therefore set f lag [j] to 0, where j=0 for thread A.

the third condition (line 7, turn [0]=1) tests TRUE since thread B has set turn[0] to 1.

Since all three conditions are TRUE, thread B cannot enter the critical section. Back to thread A, since one of the while-loop conditions tests FALSE, the critical section of the code in thread A can be entered. Since the for-loop is only executed once, it drops out of this code and resets flag [0] to −1.

Since flag [0] has been reset to −1, flag [0] is less than 0, thereby making the second while-loop condition (flag [j]>=0) of thread B FALSE. As a result, thread B drops out of the while-loop and enters the critical section of code. Once thread B scompletes the critical section, it also resets its flag to −1.

Thus, a contending thread may enter its critical section if a concurrent thread has completed its critical section of code (flag [j]<k and turn [k]=i); or if a concurrent thread has not yet entered its critical section of code (flag [j]>=k and turn [k]<>i or flag [j]<k and turn [k]=i). In the former case, thread j entered the processing queue before thread i, and thread i may execute the critical section when thread j completes. In the latter case, thread i entered the processing queue before thread j, and thread i executes the critical section first.

When the concurrent thread has completed executing its corresponding critical section of code, it resets its status f lag. For purposes of illustration in FIGS. 2 and 3, the status f lag has been shown to be reset to the value −1. Of course, other values may be used, including Boolean values.

Yielding Algorithm

The yielding algorithm entails a yielding process in which a thread relinquishes its remaining quantum of execution time (as determined by an operating system scheduler, for instance) to another thread in the processing queue, as opposed to execution time being lost in the course or normal OS thread scheduling, and as opposed to relinquishing its quantum of execution time once it is allowed to enter its critical section.

Once a thread yields to another thread, it may re-enter the processing queue at some other time. For instance, the time can be determined by the operating system, such as in accordance with an operating system scheduling algorithm. Typically, an operating system assigns a time quantum to each thread, after which a given thread is preempted and placed at the end of the run queue. Eventually, the given thread moves to the front of the queue and gets scheduled on the next available CPU.

A method for a yielding algorithm is illustrated in FIG. 5. The method begins at block 500 and continues to block 502 where a first thread enters a processing queue for obtaining permission to enter a critical section of code. At block 504, a determination is made as to whether a yield count has expired.

If the yield count has expired, then the first thread exits the processing queue at block 514. If the yield count has not expired, then it is determined at block 508 if a second thread exists, where the second thread executes code concurrently with the first thread entering the processing queue.

If a second thread does not exist (i.e., j=i), then at block 506, the critical section of code is executed. If a second thread exists (i.e., j<>i), then at block 510, it is determined if the second thread is executing the critical section. If the second thread is not executing the critical section, then at block 506, the first process executes the critical section. If the second thread is executing the critical section, then at block 512, a test is performed to determine if the second thread has completed executing the second critical section.

If the second thread has completed executing the critical section, then the first thread executes the critical section at block 506. If the second thread has not completed executing the critical section, then the process is repeated starting at block 504. The method ends at block 516.

In summary, the method ends when the first critical section of code is executed as a result of a non-existent second thread; as a result of a second thread that has completed executing its corresponding second critical section of code; or as a result of the yield count expiring.

Yield Count

In a yielding algorithm, a thread may enter the processing queue for a determined amount of time, the determined amount of time hereinafter called the yield count. Once the yield count expires by being reached or exceeded, the thread relinquishes its time in the processing queue.

The yield count may be derived from a number of factors. In one embodiment, the yield count is based on the number of threads contending for a lock on the shared resource. In other embodiments, the yield count may be based on the number of CPUs, the system configuration, and/or any combination of the number of threads contending for the lock, the number of CPUs, and the system configuration.

FIRST EMBODIMENT

In one embodiment, the yielding algorithm is implemented in the Java language, as illustrated in FIG. 4. In a Java embodiment, yielding is supported in the Java language through the use of a yield( ). In this embodiment, the yield count is equal to two times the number of threads contending for the lock.

One way to implement the yielding algorithm using a yield count based on the number of threads contending for the lock is for a programmer to hardcode the number of threads that could potentially contend for the shared resource.

Another way to implement the yielding algorithm is to implement it within a Java Virtual Machine (JVM). According to "Microsoft Computer Dictionary", Fourth Edition, Microsoft Press, 1999, a JVM is an environment in which Java programs run. It gives Java programs a software-based "computer" they can interact with. A JVM is not a real machine, but exists in software. Since the JVM manages Java threads, the JVM is in the best position to know, at run time, the number of threads contending for a given shared resource.

In embodiments of the invention, the yielding algorithm may be implemented in a JVM tuned for Intel Architecture processors, such as the Itanium™ processor family.

SECOND EMBODIMENT

It is also possible that Intel Architecture Streaming SIMD (Single Instruction, Multiple Data) Extensions (SSE) may be used. For instance, notice that in the algorithm, flag [i] which is the single-writer, is never read by the $i^{th}$ thread, only written (see FIG. 3, line 11). However, the write needs to be made globally visible to the other threads/CPUs as soon as possible, since other threads will be reading the value of this variable. Thus, SSE "streaming stores" can be used by the JVM for the write to flag [i].

Figure 6:
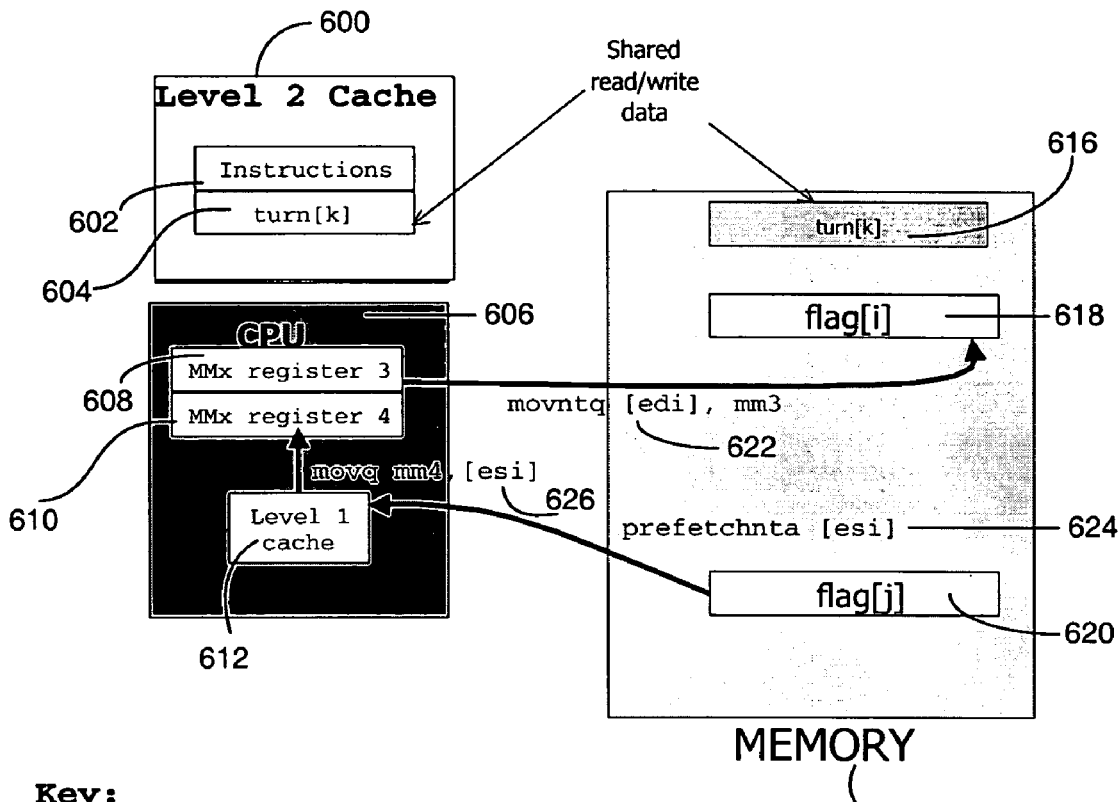
FIG. 6 illustrates a system for the yielding algorithm in accordance with one embodiment of the invention.

In reference to FIG. 6, assume that thread i is running on CPU 606. Thread i must write to flag [i] 618 (FIG. 3, line 11). This is accomplished using the SSE movntq instruction 622, where [edi] points to the memory 614 location corresponding to flag [i] 618, and CPU register MM3 608 holds the value to be written into flag [i] 618. Notice that the streaming store bypasses the CPU's Level 2 Cache 600. This helps to avoid polluting the Level 2 cache 600 with data that is never read.

Similarly, it would be beneficial to use prefetchnta 624 instruction to bring the flag 620 values into the closest cache level, Level 1 cache 612, of the CPU 606. In FIG. 6, the SSE prefetchnta 624 instruction is used to fetch the value of flag 620, where j≠i, into the CPU's Level 1 cache 612. Note that the prefetchnta 624 bypasses the CPU's Level 2 cache 600. This helps to avoid polluting the Level 2 cache 600 with data that is going to be modified by another CPU/thread. A normal movq instruction 626 is used to read the flag 620 value into a CPU register MM4 610 to perform the actual comparison operation as in the algorithm (see FIG. 3, line 6).

Since turn [k] 614 is a multi-writer variable, it does not benefit from the SSE instructions. It is read and written using the normal movq or mov instructions of the processor.

Since the use of SSE helps to avoid pollution of CPU's Level 2 cache 600, it improves performance by permitting the increased use of Level 2 cache 600 to hold other needed instructions 602 and data, such as the turn [k] variable 604.

CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, while embodiments herein are described with reference to an environment using the Java Virtual Machine, the invention is not so limited. This invention can equally be applied to other run-time environments, including the Microsoft.NET Common Language Runtime, and other programming languages, such as the C# language. Likewise, the invention is not limited to Intel processors.

What is claimed is:

1. A method comprising:
   a. initializing shared variables, the shared variables including a turn variable, a first status flag, and a second status flag;
   b. reading the shared variables into a memory;
   c. entering a processing queue;
   d. determining if a yield count has expired, wherein the yielding count is the amount of time a first thread is to remain in the processing queue;
   e. if the yield count has expired, then exiting the processing queue and the first thread relinquishes its remaining quantum time to another thread in the processing queue;
   f. if the yield count has not expired, then for a contending process, determining if a concurrent process exists;
   g. retrieving the second status flag and the turn variable from the memory, reading the second status flag into a first cache and reading the turn variable into a second cache to determine if the concurrent process is executing a critical section of code, wherein the second cache is larger than the first cache;
   h. if the concurrent process is not executing a critical section of code, then entering the critical section of code, and upon completing the critical section of code, resetting the first status flag, wherein resetting the first status flag comprises retrieving a reset value from a register; and
   i. if the concurrent process is executing the critical section of code, then repeating d through i.

2. The method of claim 1, further comprising re-entering the processing queue after a period of time.

3. The method of claim 2, wherein the period of time is determined by an operating system scheduling algorithm.

4. A machine-readable storage medium having stored thereon data representing sequences of instructions, the sequences of instructions which, when executed by a processor, cause the processor to perform operations comprising:
   a. initializing shared variables, the shared variables including a turn variable, a first status flag, and a second status flag;
   b. reading the shared variables into a memory;
   c. entering a processing queue;
   d. determining if a yield count has expired, wherein the yielding count is the amount of time a first thread is to remain in the processing queue;
   e. if the yield count has expired, then exiting the processing queue and the first thread relinquishes its remaining quantum time to another thread in the processing queue;
   f. if the yield count has not expired, then for a contending process, determining if a concurrent process exists;
   g. retrieving the second status flag and the turn variable from the memory, reading the second status flag into a first cache and reading the turn variable into a second cache to determine if the concurrent process is executing a critical section of code, wherein the second cache is larger than the first cache;
   h. if the concurrent process is not executing a critical section of code, then entering the critical section of code, and upon completing the critical section of code, resetting the first status flag, wherein resetting the first status flag comprises retrieving a reset value from a register; and
   i. if the concurrent process is executing the critical section of code, then repeating d through i.

5. The machine-readable storage medium of claim 4, wherein the sequences of instructions when executed by the processor, further cause the processor to perform operations comprising: re-entering the processing queue after a period of time.

6. The machine-readable storage medium of claim 5, wherein the period of time is determined by an operating system scheduling algorithm.

* * * * *

UNITED STATES PATENT AND TRADEMARK OFFICE
CERTIFICATE OF CORRECTION

PATENT NO. : 7,080,376 B2
APPLICATION NO. : 09/960545
DATED : July 18, 2006
INVENTOR(S) : Buch It is certified that error appears in the above-identified patent and that said Letters Patent is hereby corrected as shown below:

In column 1, at line 56, delete ""syncobj"" and insert --"syncObj"--.

In column 1, at line 58, delete ""syncobj"" and insert --"syncObj"--.

In column 5, at line 19, delete "f lag" and insert --flag--.

In column 6, at line 67, after "flag" insert --[j]--.

In column 7, at line 2, after "flag" insert --[j]--.

In column 7, at line 7, after "flag" insert --[j]--.

In column 7, at line 10, delete "614" and insert --616--.

Signed and Sealed this

Fourth Day of December, 2007

JON W. DUDAS
*Director of the United States Patent and Trademark Office*